(12) United States Patent
Mendez et al.

(10) Patent No.: US 7,397,976 B2
(45) Date of Patent: Jul. 8, 2008

(54) FIBER OPTIC SENSOR AND SENSING SYSTEM FOR HYDROCARBON FLOW

(75) Inventors: Alexis Mendez, Alameda, CA (US); Evangelos V. Diatzikis, Chuluota, FL (US)

(73) Assignee: Vetco Gray Controls Limited, Nailsea, Bristol (GB)

( * ) Notice: Subject to any disclaimer, the term of this patent is extended or adjusted under 35 U.S.C. 154(b) by 290 days.

(21) Appl. No.: 11/042,850

(22) Filed: Jan. 25, 2005

(65) Prior Publication Data
US 2006/0165344 A1   Jul. 27, 2006

(51) Int. Cl.
G02B 6/00 (2006.01)
G02B 6/02 (2006.01)
(52) U.S. Cl. .............................. 385/12; 385/13; 385/128
(58) Field of Classification Search .................. 385/12, 385/13, 128
See application file for complete search history.

(56) References Cited

U.S. PATENT DOCUMENTS

| | | | |
|---|---|---|---|
| 5,378,889 A | | 1/1995 | Lawrence |
| 5,435,395 A | * | 7/1995 | Connell ..................... 166/384 |
| 5,845,033 A | * | 12/1998 | Berthold et al. ............... 385/12 |
| 5,872,876 A | * | 2/1999 | Kluth et al. .................... 385/12 |
| 6,513,385 B1 | | 2/2003 | Han et al. |
| 6,555,807 B2 | * | 4/2003 | Clayton et al. ......... 250/227.16 |
| 6,561,488 B1 | | 5/2003 | Walker |
| 6,615,848 B2 | | 9/2003 | Coats |
| 6,630,658 B1 | | 10/2003 | Bohnert et al. |
| 6,644,402 B1 | | 11/2003 | Sharma et al. |
| 6,766,703 B1 | * | 7/2004 | Kluth et al. ................ 73/866.5 |
| 6,995,677 B2 | * | 2/2006 | Aronstam et al. ........... 340/606 |

FOREIGN PATENT DOCUMENTS

JP          61-004008      * 9/1986

OTHER PUBLICATIONS

Aarseth, F., "Wax and Hydrate Control with Electrical Power," Journal of Petroleum Technology, pp. 816-817, Aug. 1997.
Lagakos, N. et al., "Phase-Modulated Fiber Optic Acoustic Sensors," ISA Trans., vol. 28, No. 2, pp. 1-6, 1989.
Budiansky, B. et al., "Pressure Sensitivity of a Clad Optical Fiber", Appl. Opt., vol. 18, No. 24, pp. 4085-4088, 1979.

(Continued)

*Primary Examiner*—Charlie Peng
(74) *Attorney, Agent, or Firm*—Bracewell & Giuliani LLP (57) ABSTRACT

An assembly senses fluid pressure variations within a passageway along a length of a flowline. A fiber optic cable is disposed axially within the passageway of the flowline. The fiber optic cable experiences a mechanical strain responsive to variations in the fluid pressure of the fluid communicating through the passageway of the flowline along the length of the flowline. The assembly also includes an enhancing layer surrounding the fiber optic cable. The enhancing layer is more responsive to the fluid pressure of the fluid communicating through the passageway of the cable than the fiber optic cable, which enhances the responsiveness of the fiber optic cable to the pressure by magnifying the mechanical strain associated with the fiber optic cable within a particular region of varying fluid pressure. Strain associated with the cable is communicated through back-reflected light.

27 Claims, 7 Drawing Sheets

OTHER PUBLICATIONS

Parker, T. R. et al., "A Fully Distributed Simultaneous Strain and Temperature Sensor using Spontaneous Brillouin Backscatter," Photonics. Tech. Lett., vol. 9, No. 7, pp. 979-981, Jul. 1997.

Horiguchi, T. et al., "Measurement of Temperature and Strain Distribution by Brillouin Frequency Shift in Silica Optical Fibers," SPIE Proc. OE/Fibers '92, Fiber Optic Sensors II session, pp. 2-13, 1992.

Hughes, R. et al., "Static Pressure Sensitivity Amplifications in Interferometric Fiber-Optic Hydrophones,"Appl. Opt., vol. 19, No. 1, pp. 98-107, 1980.

Shimizu, K., et al., "Coherent Self-Heterodyne Brillouin OTDR for Measurement of Brillouin Frequency Shift Distribution in Optical Fibers," 8217 Journal of Lightwave Technology 12, pp. 730-736, May 1994, New York, NY, IEEE Log No. 9216329.

* cited by examiner

FIBER OPTIC SENSOR AND SENSING SYSTEM FOR HYDROCARBON FLOW

BACKGROUND OF THE INVENTION

1. Field of the Invention

The present invention relates to an apparatus and method for sensing hydrostatic pressure, in a distributed fashion, in hydrocarbon pipelines and wells. The invention is particularly concerned with the detection and localization of flow restrictions and blockages in hydrocarbon flowlines for flow assurance purposes.

2. Background of the Invention

As part of the overall process of oil extraction and processing, it becomes necessary to transport the fluids containing liquid hydrocarbons from their reservoirs to remote plants for chemical processing. This transport process is usually conducted and pipelines that can be anywhere from several hundred meters to various kilometers in length. Ensuring the safe, reliable and continuous transport of hydrocarbons through the pipelines is of vital importance to oil companies and hydrocarbon refineries. It is also equally important to properly measure the pressure, flow and composition of the produced fluid. However, the transport of liquid hydrocarbons is faced with serious problems such as the buildup of wax and scale in the pipe walls, internal pipe erosion and corrosion, formation of hydrates and asphaltenes, and several others.

It is well understood that fluid containing heavy hydrocarbons tend to precipitate and form waxy crude oils as they flow through pipelines. These paraffin precipitates deposit on the inner walls of pipes accumulating over time and forming a solid layer that narrows the passage of any liquid flow. In addition, other chemicals present such as sulfates, calcium carbonate, drilling fluids, and other scale precipitates, start depositing solid debris layers that further obstruct the fluid flow. Obviously, if one were to know the mechanisms of wax formation, it would be possible to predict the time at which a dramatic flow reduction would occur. This is in practice possible, but in order to make the analytical models accurate and effective, it is necessary to have accurate measurements of deposited wax thickness. This is not an easy task to perform on operational flowlines and most methods available are based on invasive or destructive techniques to arrive at the sought wax thickness value.

Ensuring pipeline safety and reliability, and the flow assurance of hydrocarbons are the main drivers for the development of new, on-line, monitoring techniques for the detection and localization of wax and hydrate build-ups and blockages in oil pipelines. Pipeline blockages have dramatic operational and economic consequences. For example, consider an oil-field with 8 wells, each producing 10,000 barrels of oil per day (B/d). The importance of operating at peak efficiency of transport within a pipeline is demonstrated by considering that a 5% increase in efficiency—for a pipeline transporting 80,000 B/d of crude—would result in an increase of 4,000 B/d in transported oil. This would translate to an annual revenue increase of $36 million, assuming $25/barrel. Furthermore, as oil production practices move to regions with deeper reservoirs and cold waters, these problems become more serious, and thus it becomes increasingly important to develop monitoring systems that alert operators when the conditions are critical for wax and paraffin formation to occur.

In general, there are two popular approaches to dealing with this problem: chemical injection and pigging. In the case of injection, chemical inhibitors are injected inside the pipeline to prevent the formation of, or dissolve any wax or hydrate build-up. Pigging consists in the mechanical removal of deposited wax and build-ups inside pipelines via a mechanical swab element commonly known as a "pig". The pig is commonly inserted inside the flowline through an access port, and pushed forward by fluid pressure or some other mobile mechanism. As the pig moves, it scrapes the inner surfaces of the conduit, removing any wax or scale build-up present. For instance, in U.S. Pat. No. 6,615,848, Coats illustrates the use of an electronically controlled pig element that is buoyant and able to travel inside pipelines. The pig has provisions for the measurement and removal of build-up and avoids damage to the interior pipe walls by the use of a selectively expandable body. However, both the above-mentioned approaches are expensive and cumbersome, and they also require periodic maintenance and calculated guessing on the part of the operators to determine an appropriate time to conduct the chemical injection or pigging operations. Chemical injection also carries the risk of contaminating produced water, restricting its release to the sea.

In an effort to reduce the costs associated with ensuring the flow of produced fluids from the wellhead to the primary processing facility based on the above techniques, the oil industry has shown increasing interest in reducing wax build-up and in on-line monitoring instrumentation. One approach is to use electrical heating and insulation of long and deep flowlines, to prevent hydrate or wax formation. This technique may be augmented by the use of a distributed fiber optic temperature sensor to help obtain temperature profiles of the flowline and detect the onset and location of possible blockages, as well as cold temperature zones along the flowline. However, for this approach to become practical, it becomes necessary to have access to the pipeline prior to its deployment in order to install the necessary electrical heating conductors and associated monitoring optical fibers and thermal insulation.

Other on-line monitoring systems rely on the non-intrusive detection of blockages via acoustic or strain measurements taken from the outside of the flowline. U.S. Pat. No. 6,513,385 describes an acoustic sensor based on a piezoelectric transducer that emits an acoustic pulse signal. The pulse traverses the pipeline walls as well as the various deposited layers until it impinges on the opposite side wall, where the pulse is reflected back to the transmitter. Wax build-up layers are detected by measuring the time delays between incoming and returning pulses arriving at the acoustic transmitter. As before, one problem here is the fact that sensor heads need to be installed and secured around the flowlines. This presents difficulties for retrofitting into existing subsea installations. In addition, the technique might not be effective until a certain wax layer thickness is developed and, often times, it becomes necessary to calibrate and couple the system to a particular pipe and build-up combination.

Berthold et al., in U.S. Pat. No. 5,845,033, describe a fiber optic blockage detection system based on an array of fiber Bragg grating strain sensors disposed along a continuous fiber length. The sensor arrayed is mounted or spirally strapped around the exterior of a pipeline so that there is good mechanical transfer of the pipe stresses to the fiber. Any internal pressure change resulting from a flow restriction or blockage will result in a hoop strain that can be detected by the fiber Bragg grating strain sensors. As before, this approach assumes that the fiber installation can be accomplished prior to the pipeline installation itself. In addition, proper mechanical bonding and strain transfer between the pipeline and optical fiber control the efficacy of the technique. Any unwanted stress in the pipe which is not directly the result of an internal hydrostatic pressure change, can give rise to an erroneous reading or false blockage detection.

SUMMARY OF THE INVENTION

An assembly for sensing fluid pressure variations along a length of a flowline may be installed in an existing flowline. The assembly includes a fiber optic cable disposed axially within the passage of the flowline. The fiber optic cable experiences a mechanical strain responsive to variations in the fluid pressure of the fluid communicating through the passageway of the flowline along the length of the flowline. The assembly also includes an enhancing layer surrounding the fiber optic cable. The enhancing layer is more responsive to the fluid pressure of the fluid communicating through the passageway of the cable than the fiber optic cable. The enhancing layer enhances the responsiveness of the fiber optic cable to the pressure by magnifying the mechanical strain associated with the fiber optic cable within a particular region of varying fluid pressure.

The present invention allows for the on-line and real-time detection and localization of flow restrictions and blockages in oil pipelines and wells. The assembly measures the internal hydrostatic pressure along a region of interest in hydrocarbon producing systems, in a distributed fashion, using an optical interrogation technique based on the measurement of the back-reflected Brillouin scattering of the light traveling inside said coated fiber.

The present invention detects the presence of blockages in hydrocarbon production systems—such as flowlines, well tubing, injection lines, pipelines, umbilicals, and any other fluid-transporting conduit—caused by asphaltenes and paraffin deposits by measuring changes in the internal hydrostatic pressure induced by the flow constriction caused by the deposits build-up, without the sensing optical fiber obstructing or impeding the hydrocarbon flow. Any and all regions along the coated fiber under the influence of an external hydrostatic pressure will induce an internal strain in the fiber, which will produce localized changes in the amount of Brillouin backscattering of the light traveling inside the fiber.

The present invention can also locate the physical location of a blockage or obstruction along the total length of a hydrocarbon pipeline or well by measuring the time of flight of the back reflected Brillouin scattered light traveling inside the optical fiber exposed to the region of interest.

DETAILED DESCRIPTION OF THE PREFERRED EMBODIMENT

Figure 1:
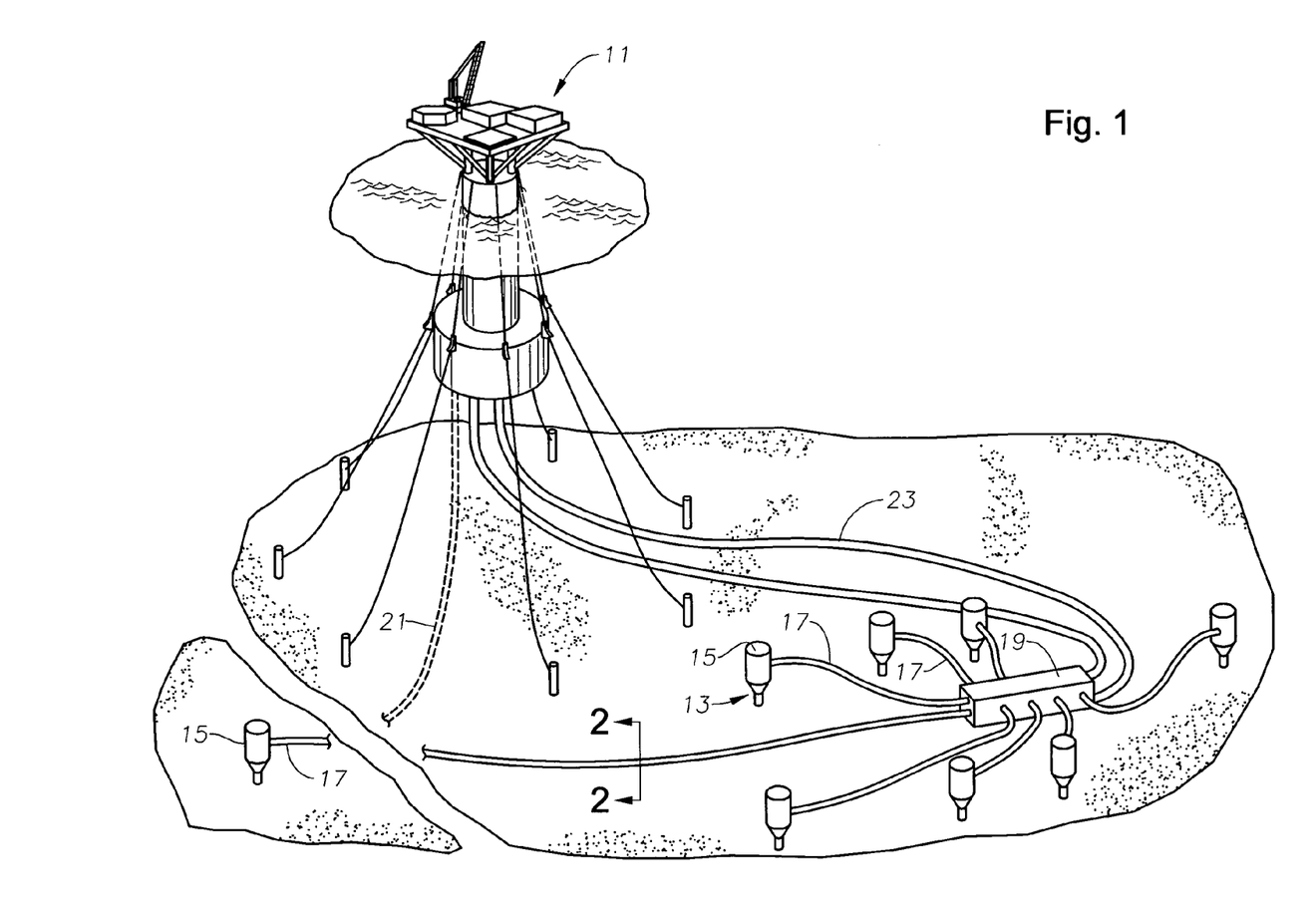
FIG. 1 is a perspective view illustrating a vessel receiving well fluid from a subsea collection manifold that is receiving well fluid from a plurality of subsea wells through a plurality of flowlines, constructed in accordance with the present invention.

Referring to FIG. 1, a vessel 11 collects well fluids from subsea wells 13 situated in a cluster on a sea floor 12. Preferably, each subsea well 13 includes a subsea wellhead 15 protruding above the sea floor 12. A production line 17 extends from each wellhead 15 to a collection manifold 19 situated on the subsea floor 12. A riser 23 extends from the collection manifold 19 to the vessel 11 for transferring well fluids from the subsea floor 12 to the vessel 11. As will be readily appreciated by those skilled in the art, the riser 23 can preferably include a plurality of individual risers 23 or a bundle of individual tubular structures for supplying segregated streams of well fluid from the collection manifold 19 to the vessel 11. In some situations, it is desirous to connect production line 17 to vessel 11 via a riser 21 rather than to collection manifold 19 and through common riser 23. While vessel 11 is shown as a floating platform in FIG. 1, vessel 11 is merely representative and those readily skilled in the art will appreciate that vessel 11 can be numerous surface vessels including platforms, both that float or are secured to the sea, and tankers.

Figure 2:
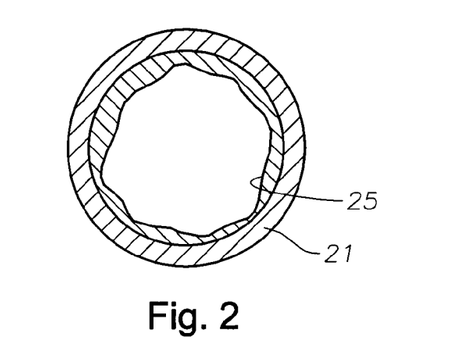
FIG. 2 is a sectional view of a flowline of FIG. 1, when viewed along line 2-2 of FIG. 1.

Referring to FIG. 2, a deposit 25 is formed on the interior surface of production line 17. Deposit 25 reduces the diameter of flowline 17 for fluids to pass. Over their service life, hydrocarbon producing flowlines suffer from wax, scale and hydrate build-ups that deposit on the inner walls of the transporting pipes, constricting the oil flow and, in some instance, clogging them completely. Any diameter reduction or obstruction caused by build-ups on the inside of the pipe will result in a flow change, which, by Bernoulli's principle, will result in a pressure change. Deposit 25 can also form in risers 21, 23. For the ease of description, deposit 25 is only shown in flowlines 17, however, it should be readily appreciated by those skilled in the art that the present invention is also applicable for use in risers 21, 23. Accordingly, for the present invention, risers 21, 23 within this description should be understood to also be flowlines.

Figure 3:
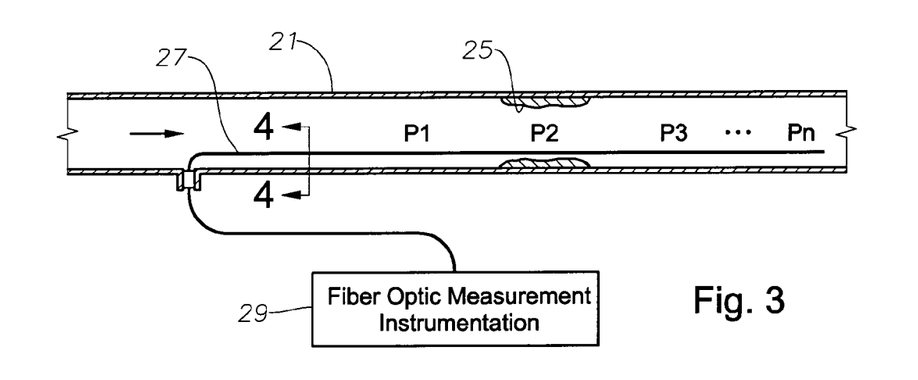
FIG. 3 is a sectional view of one of the flowlines of FIG. 1 with a fiber optic line extending through it flowline in accordance with the present invention.
Figure 10:
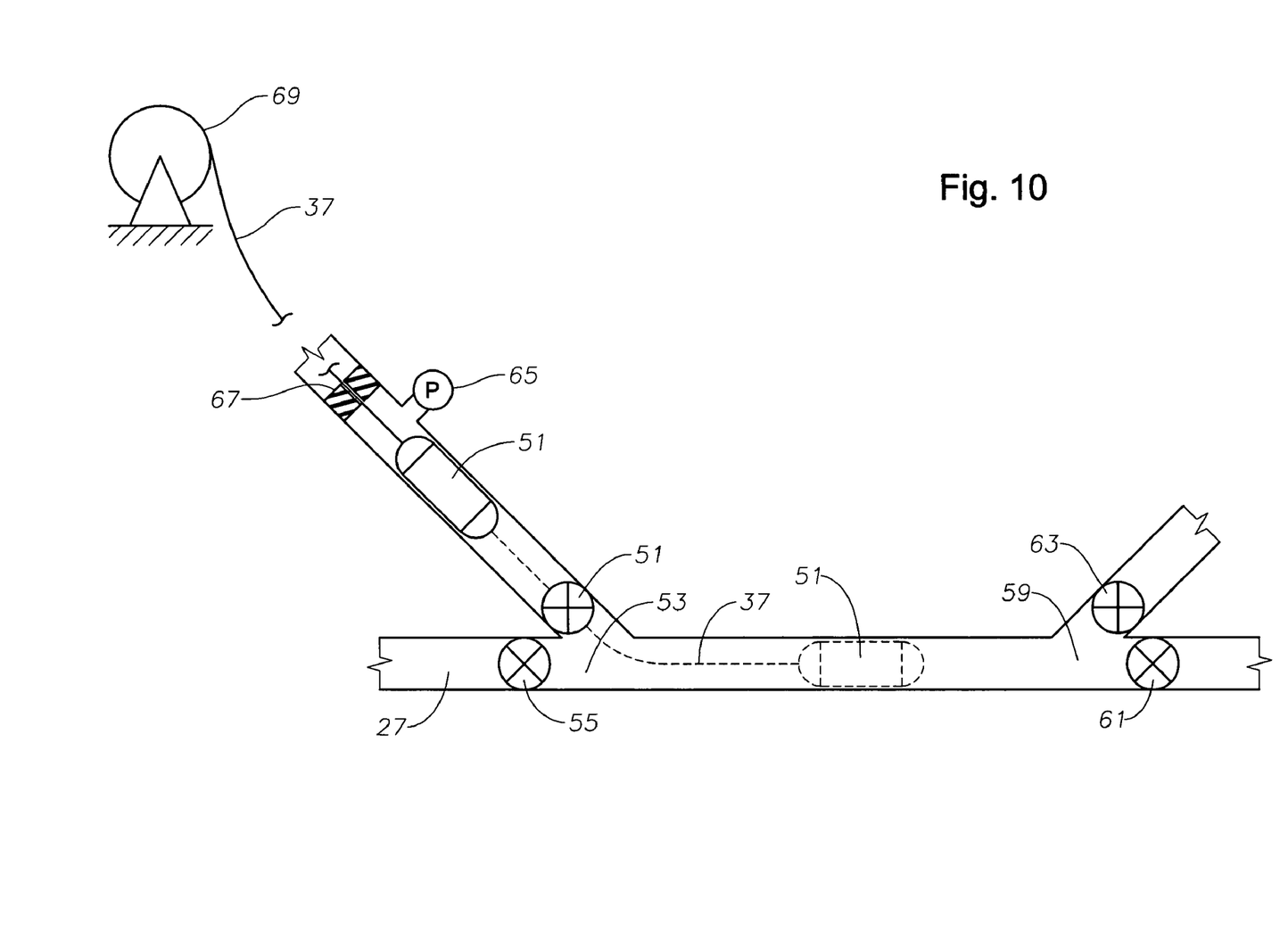
FIG. 10 is a schematic sectional view of an assembly constructed in accordance with the present invention that is used to install the fiber optic line of FIG. 4 into one of the flowlines of FIG. 1.

Referring to FIG. 3, a fiber optic line 27 is shown disposed axially within an interior passage defined by flowline 17. Fiber optic line 27 extends a desired length though a portion of flowline 17. Fiber optic line 27 is preferably run through or installed in an existing flowline 17 with the assistance of a pump through pig (FIG. 10). Depending on the length of flowlines 17, fiber optic line 27 can extend for hundreds of meters, and even several kilometers. Fiber optic line 27 is not physically attached to the walls of flowline 17, rather it loosely lays inside. A fiber optic measurement instrumentation 29 is attached to an end of fiber optic cable 27 at a convenient location, such as on vessel 11 (FIG. 1). Fiber optic line 27 is in fluid communication with the fluid passing through flowline 17. The fluid within flowline 17 has a hydrostatic pressure $P_1, P_2, P_3, \ldots, P_n$ along the length of flowline 17. The hydrostatic pressure acts on the entire length of fiber optic line 27 within flowline 17. The hydrostatic pressure is dependant upon the inner diameter of flowline 17 through which the fluid passes. Therefore, in regions having deposits 25, the hydrostatic pressure $P_2$ is greater than the hydrostatic pressure $P_1$ upstream of deposit 25. Thus, deposit 25 creates a pressure differential that is communicated to the outer surface of fiber optic line 27. Such a pressure differential creates a strain on fiber optic line 27 that is detected by fiber optic measurement instrumentation 29.

Figure 4:
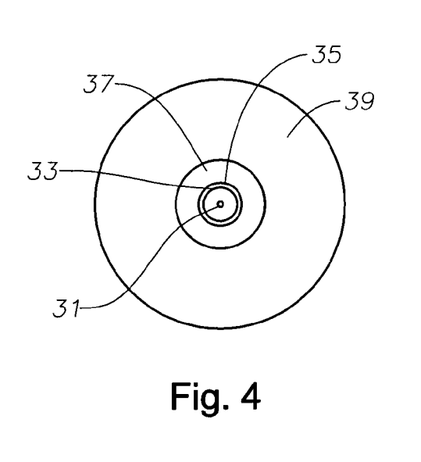
FIG. 4 is a sectional view of the fiber optic line of FIG. 3, when viewed along line 4-4 of FIG. 3.
Figure 5:
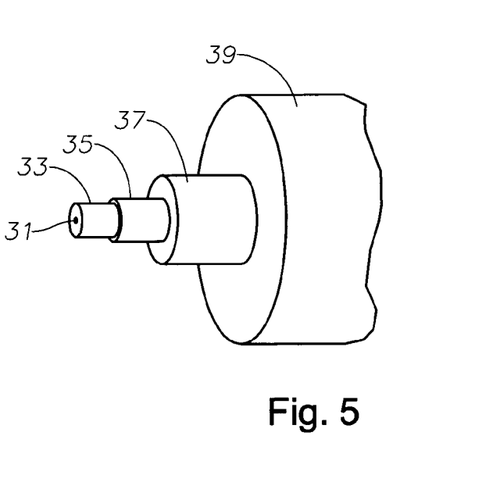
FIG. 5 is a schematic isometric view of the fiber optical line of FIG. 3.

Referring to FIGS. 4 and 5, a preferred embodiment of fiber optic line 27 is shown in a manner illustrating various rings or segments. Fiber optic line 27 includes a core 31 and a cladding 33 surrounding core 31. Light waves travel through core 31. Cladding 33 can comprise an acrylic material surrounding core 31 such that the diameter of the combination of core 31 and cladding 33 is about 180 microns. An inner coating 35, which can be another acrylic material, preferably surrounds cladding 33. Inner coating 35 may be a polyhemite hemetic coating, which helps protect the glass matrix of core 31 from harsh chemicals that may be present in the fluid. The addition of inner coating 35 preferably increases the diameter to about 250 microns. An intermediate coating 37 preferably surrounds inner coating 37. Intermediate coating 37 is preferably a layer of silicone that increases the diameter to about 400 microns. An outer coating 39 surrounds inner coating 37. Outer coating 39 is typically the final coating, and is preferably nylon. The diameter increases to about 1200 microns with the addition of outer coating 39. By increasing the size of the diameter of fiber optic line 27, the effects of strain due to pressure differentials created by the presence of deposits 25 is enhanced or magnified. Therefore, the presence of at least outer coating 39 increases the sensitivity of fiber optic line 27 to pressure differences within flowline 17.

A fiber with suitable coatings deployed inside a subsea flowline would then be able to convert the hydrostatic pressure acting along its length from the liquid hydrocarbons, into a strain, which can be detected and processed by the proposed Brillouin scattering interrogation technique outlined before in U.S. Pat. No. 6,555,807, issued to Clayton et al.

Referring to FIG. 10, fiber optic line 27 is typically installed within flowline 21 with the assistance of a deploying device 51. In the preferred embodiment, deploying device is a pig. Deploying device 51 typically enters flowline 21 through a Y-shaped converger 53 of flowline 21. An upstream main valve 55 is located in flowline 21, and converging valve 57 is located within the portion of converger 53 feeding into flowline 21. Deploying device 51 typically exits flowline 21 through Y-shaped diverter 59. Diverter 59 preferably includes a downstream main valve 61 located in flowline 21 and a diverting valve 63 located in the portion of diverter 59 extending away from flowline 21. A pump 65 preferably feeds into the converging portion of coverger 53 upstream of converging valve 57, and a lubricator 67 is preferably located upstream of pump 65. Lubricator 67 preferably acts as a seal allowing fiber optic line 27 extend to extend into flowline 21.

Deploying device 51 is inserted into the converging portion of converger 53. An end of fiber optic line 27 is connected to a tail end of deploying device 51. The other end of fiber optic line 27 is preferably wound around a line spool 69. Lubricator 67 is installed upstream of deploying device 51 with fiber optic line 27 extending through lubricator 67. Main valves 55,61 are shut and converging and diverging valves 57,63 are opened. Pump 65 pumps a fluid into the converging portion of converger 53 behind or upstream of deploying device 51 which pushes deploying device 51 into and through flowline 17. Fiber optic line 27 is continuously fed into flowline 21 by spool 69 as deploying device travels through flowline 21. Deploying device 51 travels through the diverting portion of diverter 59 because diverting valve 63 is open and main valve 61 is closed.

Fiber optic line 27 is cut upstream of diverting valve 63 after removal of deploying device 51 so that diverting valve 63 can be closed. Fiber optic line 27 is cut prior to spool 69, and spool 69 is replaced with fiber optic measurement instrumentation 29. Main valves 55,61 are then opened which allows production fluid to flow through flowline 17, thereby creating pressures to be sensed by fiber optic line 27. An alternative method of deploying fiber optic line 27 can be that described in U.S. Pat. No. 6,561,488, which locates the spool on the pig and has the end of the cable fixed upstream of the pig. Fiber optic line 27 remains in flowline 17 during operations while fluid is pumped through flowline 17. Monitoring pressures along the length of flowline 17 over time allows the operator to more easily recognize and identify build-ups of deposit 25. Preferably, fiber optic line 27 remains in flowline 17 while a pig design for cleaning of pipelines is run through flowline 17, or during chemical cleaning of flowline 17. Alternatively, flowline 17 can be removed and replaced with another flowline 27 after cleaning in harsh conditions or in the event fiber optic line 27 is damaged during cleaning.

In operation, the present invention converts hydrostatic pressure acting along a fiber optic line 27, into a distributed mechanical strain. Measurements of distributed pressure can be thus inferred by converting the applied hydrostatic pressure $P_1, P_2, P_3, \ldots, P_n$ into distributed mechanical strain acting on fiber 27, and measuring the strain changes by the Brillouin scattering frequency shifts they experience.

Amplification of the effective pressure acting on fiber line 27 by the plurality of coatings 33, 35, 37, 39 applied to core 31 allows for a more effective pressure-to-strain conversion. The hydrostatic pressure $P_1, P_2, P_3, \ldots, P_n$ acting on the outer coating 39 produce radial and axial forces on fiber line 27. These forces compress or relax the glass structure of core 31 in fiber line 37, depending on their magnitude and direction, inducing compressive or tensile stresses in the fiber line 27. The stresses produce axial and radial strains that change the refractive index of the core 31 through a photo-elastic effect. The induced strains are distributed along core 31 and proportional to the external pressure acting on the outer surface of outer coating 39 of fiber line 27 at any given point along its length. These strains are measured and spatially located along fiber line 27 by means of an interrogation system based on an optical time domain Brillouin scattering reflectometer (FIG. 5).

Based on past studies conducted to investigate the pressure response of fiber optic acoustic and hydrophone sensors, it is known that at low frequency (<1 KHz), both the axial and radials strains contribute to the fiber's sensitivity to hydrostatic pressure. The fiber's sensitivity to external hydrostatic pressure is dictated by the bulk and Young's moduli of the coating material. The bulk modulus determines the maximum dimensional changes of the coating in response to an external pressure, while the Young's modulus controls the amount of strain transferred from the coating to the fiber itself. Therefore, high-pressure sensitivities can be obtained using coatings with a low bulk modulus, but a high Young's moduli as described by Lagakos et al. see "Phase-Modulated Fiber Optic Acoustic Sensors", ISA Trans., Vol. 28, No. 2, pp 1-6, 1989.

The thickness of the coating is, by itself, another design parameter. Hence, for thick fiber coatings, high sensitivity is generally obtained with Teflon TFE and Teflon FEP due to their low bulk modulus. Conversely, for thin coatings, Noryl is a good choice material due to its intermediate bulk modulus and high Young's coefficient.

Budiansky et al., see "Pressure Sensitivity of a Clad Optical Fiber", Appl. Opt., Vol. 18, No. 24, pp 4085-4088, 1979, have developed a simple mathematical model to relate the axial strain developed in a glass fiber under hydrostatic pressure, as a function of the coating's thickness and Young's modulus. Using their expressions, for the case of an un-coated fiber, a pressure sensitivity of 0.06 mstrain/psi is obtained. However, when the fiber is coated with a material having a thickness of several hundred microns and large Young's modulus, but a low bulk modulus such as Teflon, it is possible to get a strain amplification of up to 30 times. This translates into pressure sensitivity in the fiber of approximately 1.8 mstrain/psi, which results in a minimum detectable pressure of approximately 5 psi. Such pressure resolution is within the desirable pressure resolution of +/−1 psi for a 1000 psi full pressure range flowline.

For applications involving oil flowlines, it is necessary to design coatings 33, 35, 37, 39 of fiber line 27 so that for the desired range of pressure to measure, the resultant induced strain falls within the mechanical strain limits of an optical fiber, which is of the order of 1-3%. In addition to the compliant mechanical layers, it also becomes necessary to have additional coating layers to provide both mechanical and chemical protection to the fiber against the corrosive and harsh environment downhole.

Figure 6:
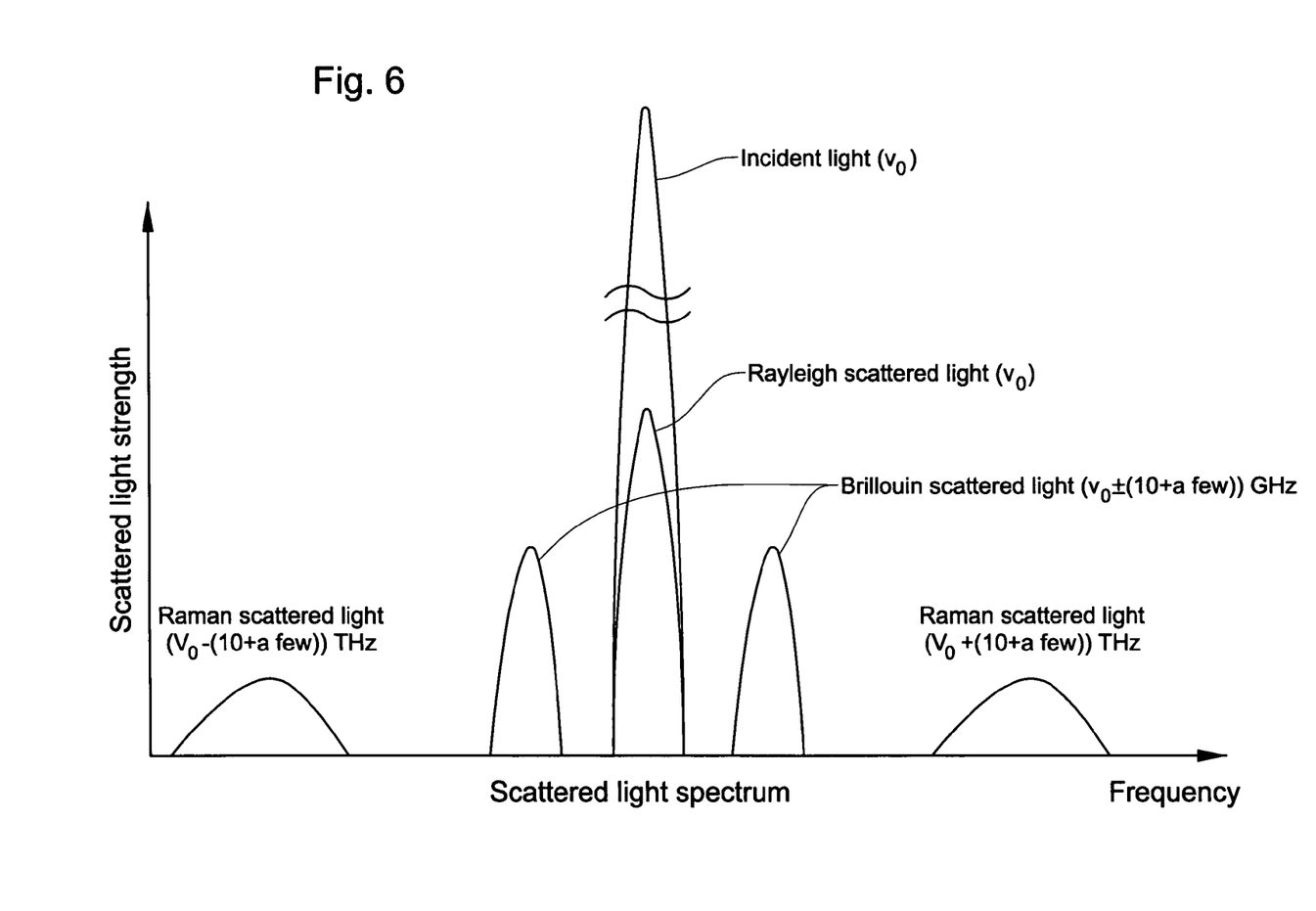
FIG. 6 illustrates a typical Brillouin light signal spectrum.

Referring to FIG. 6, when a high intensity light pulse of a very narrow linewidth (single optical frequency) is coupled into an optical fiber or fiber optic line 27, a number of different back reflected signals are generated at each point along fiber optic line 27. As discussed in U.S. Pat. No. 6,555,807 to Clayton et al., FIG. 6 depicts a typical scattered light spectrum for fiber optic line 27. The spectrum is composed of Raleigh back-scattered light of a frequency identical to that of the original source but with a much reduced amplitude. Added to this is the so-called Raman back-scattered light, are Brillouin scattering signals that also have up- and down-shifted frequency components. It can clearly be seen that the frequency shift in the case of the Brillouin scatter is much smaller than the Raman one being in the order of GHz, while the Raman is in the THz range. The other main difference is that the Brillouin scatter is at lest two orders of magnitude stronger in magnitude compared to Raman.

Raleigh scattering is related to inhomogeneities due to the material structure of fiber optic line 27. Small refractive index fluctuations scatter light in all directions without changing the frequency of the scattered light. Raman scattering occurs when light is absorbed by molecules in the medium and re-emitted at different frequencies. Brillouin scattering of light occurs as a result of the interaction between a highly coherent incident light source and an acoustic wave generated by the incident light within the guiding material, i.e. fiber optic line 27. The scattered light experiences a Doppler frequency shift, because the pressure variations of the acoustic wave are periodic and traveling in the material. This frequency shift is known as Brillouin frequency shift and is dependent on the material and its acoustic wave velocity. Typical Brillouin shifts are of the order of +/−13 GHz for incident light at 1.33 um, and of +/−11 GHz for incident light at 1.55 um.

Figure 7:
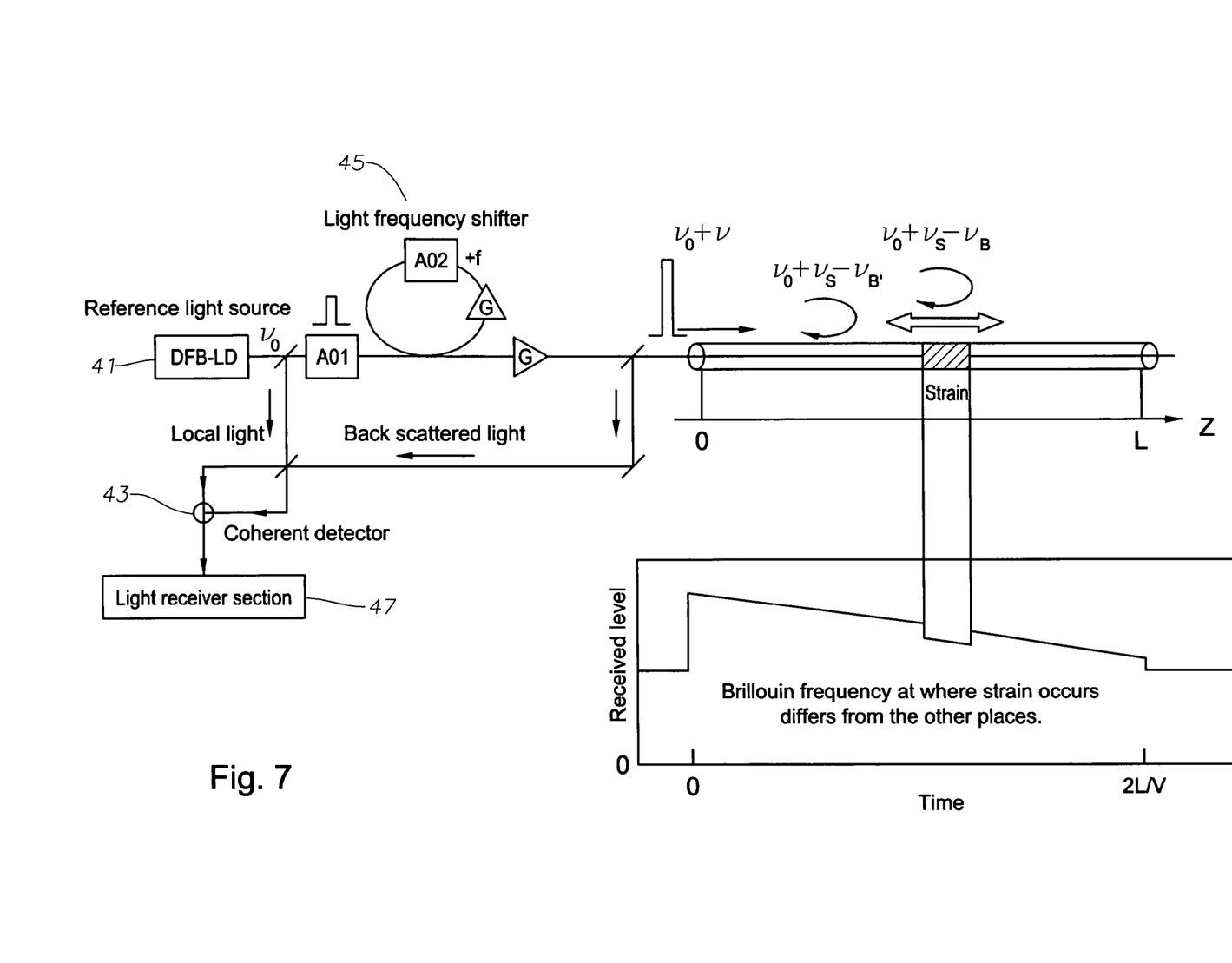
FIG. 7 is a schematic view of the fiber optic measurement instrumentation of FIG. 3 and built in accordance with the present invention.

FIG. 7 shows the basic architecture of the interrogation system employed to transmit light through fiber optic line 27, and to detect the back-reflected Brillouin scattered signals. A Distributed Feedback Laser (DFB) laser 41 is used as a light and reference source. The center frequency of this source is at $v_o$. The light is split into two signals, one acting as the reference signal in the coherent detector 43. The other is fed into a plurality of light modulators A01, A02 and a frequency shifter 45. The light modulators A01, A02 are preferably acousto-optic modulators, which modulate the incoming continuous source light into light pulses. The light pulse, at frequency $v_o+v_s$, is injected into fiber optic line 27. The back-reflected light returning to the same fiber end will be the sum of the Rayleigh and Brillouin scattered light. The returned signal is then mixed with the local reference light signal and fed into a coherent detector and thus to an analyzer.

The frequency shift in Brillouin scattering is strain dependent, with a coefficient of 433 MHz/% of strain @ 1.55 um of incident light. Therefore, any mechanical strain acting on fiber optic line 27 or resulting from and induced pressure effect, as in the present invention, will result in a frequency shift of the Brillouin scattering back-reflected signal. The greater the magnitude of the applied strain, the greater the spectral shift.

However, it should be noted that the Brillouin frequency shift is both strain and temperature dependent, which means that the net spectral shift will be the result of both temperature and strain (pressure) external effects acting on the fiber. In the preferred embodiment, one of coatings 35, 37, 39 of fiber optic line 27 acts as an insulator to reduce the effects of temperature while isolating the pressure or strain effects acting on fiber optic line 27. Typically, this insulation is accomplished by outer coating 39. Alternatively, a non-insulated fiber optic line 27, and a fiber optic line 27 that is pressure or strain isolated can be used in conjunction. First, non-insulated fiber optic line 27 receives signals dependent upon both pressure and temperature, and the signals from second fiber optic line 27 helps to distill or filter the effects of background temperature. Another alternative is the use of a different Brillouin scattering interrogation approach. As discussed by Parker et al. (see "A Fully Distributed Simultaneous Strain and Temperature Sensor using Spontaneous Brillouin Backscatter", Photonics. Tech. Lett., Vol. 9, No. 7, pp. 979-981, July 1997), the strain and temperature effects are separated by measuring both the peak amplitude and frequency shifts in back-reflected Brillouin scattering light signals.

Under the influence of a hydrostatic pressure, a standard, communications-grade, optical fiber would not experience a significant strain. This is because the primary and secondary coatings found in this type of fiber are designed to cushion and absorb external forces, thus providing the fiber with mechanical isolation. Therefore, the sensitivity of the fiber to convert a given magnitude of external pressure into a fiber strain will be determined by the fiber's coating material. Numerous studies have been conducted in the past to analyze these effects in more detail during the development of fiber optic acoustic sensors and hydrophones. The use of fiber optic line 27 with a plurality of coating layers having the appropriate thickness, combination and material properties, enhances the strains induced on the fiber by any externally acting hydrostatic pressure.

Figure 8:
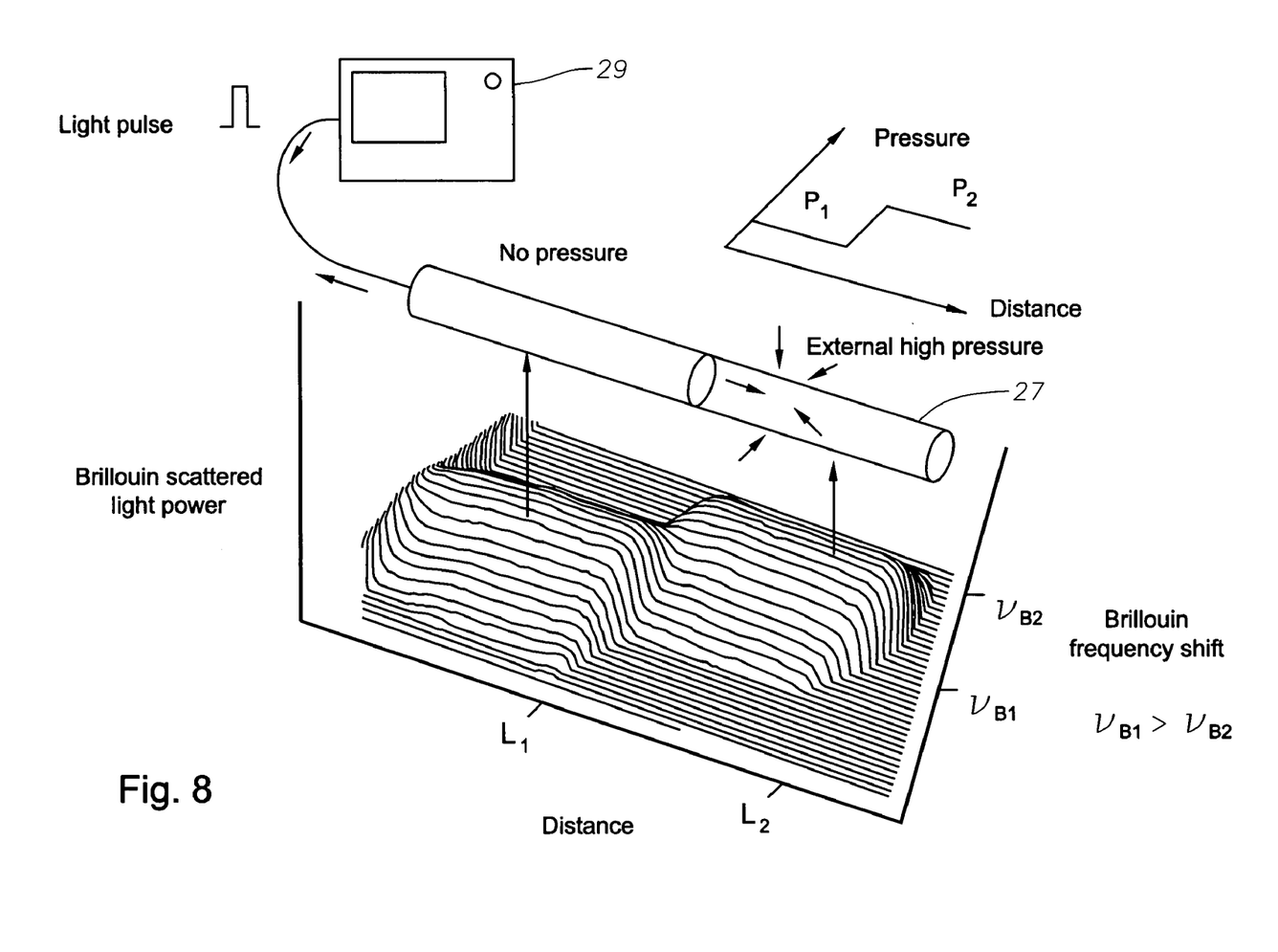
FIG. 8 is schematic representation of the distributed pressure sensing capability of the fiber optic line and fiber optic measurement instrument of FIG. 3.

Referring to FIG. 8, a fiber with suitable coatings, such as fiber optic line 27, deployed inside a flowline 17 is able to convert the hydrostatic pressure acting along its length from the liquid hydrocarbons, into a strain, which is detected and processed by the proposed Brillouin scattering interrogation technique outlined above with fiber optic measurement instrumentation 29. Fiber optic measurement instrumentation 29 sends a light pulse into fiber optic line 27 and receives back-reflected light from fiber optic line 27 due to external pressure. The three-dimensional profile illustrates a typical profile having a shift in the Brillouin frequency in the back-reflected light. As discussed above, the shift is a function of pressure, accordingly, at the length where the Brilluoin frequency shifts, the pressure profile also has an incremental increase between $P_1$ and $P_2$ on the pressure versus distance profile. FIG. 8 illustrates that the proposed invention obtains a profile of the variation of the hydrostatic pressure distribution acting along a fiber optic line 27, as a function of distance. By comparing pressure profiles over time, it is possible to determine the overall state of flow in flowline 17, as well as to identify and locate regions where formations of deposits 25 or clogging are occurring.

Figure 9:
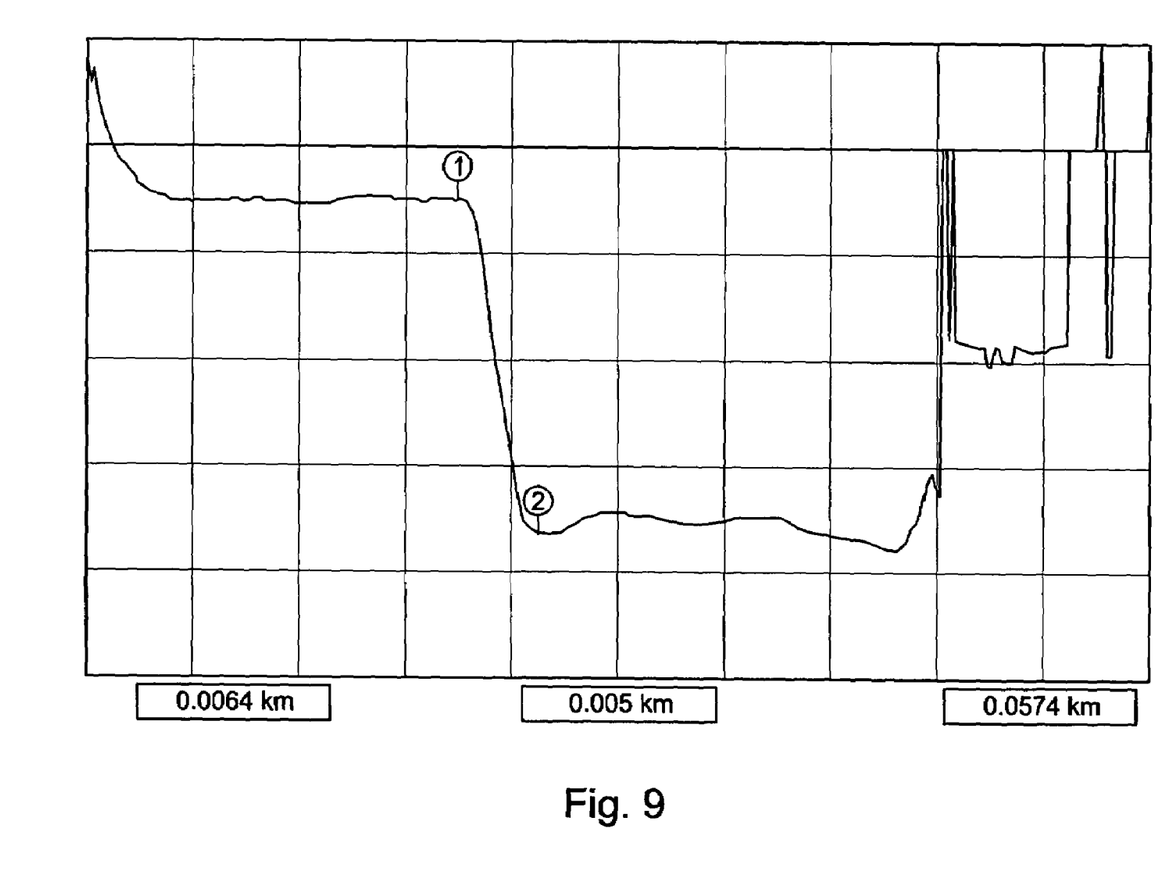
FIG. 9 is a graphical representation plotting pressure against distance for a fiber optic line built in accordance with the present invention with a portion exposed at atmospheric pressure, and another at high pressure.

FIG. 9 shows a trace on the screen of the Brillouin analyzer of fiber optic measurement instrumentation 29. The horizontal axis denotes the fiber length in kilometers. The vertical axis shows relative pressure magnitude (inferred from the induced fiber strain). This plot corresponds to the three dimensional Brillouin frequency envelope depicted in FIG. 8. The illustration of FIG. 9 is for fiber segment length of 40 meters long. The first 20 meters are exposed to atmospheric pressure, while the remaining 20 meters are under 5,000 psi of pressure. Note how the pressure profile clearly differentiates the pressure levels between the two regions. The pressure spikes observed at the beginning and at the transition of the two regions, are the result of strains introduced by hermetic penetrators and connectors used as part of the experimental test.

While the invention has been shown in only some of its forms, it should be apparent to those skilled in the art that it is not so limited but is susceptible to various changes without departing from the scope of the invention. For example, while the discussion above has focused on flowlines 17, the system can easily be used with risers 21, 23 that have already been defined as being flowlines for the sake of this invention.

The invention claimed is:

1. A method for sensing fluid pressure variations along a length of flowline, comprising:
    (a) disposing within a passageway of a flowline a fiber optic line having a fiber optic core and a layer of coating surrounding the core;
    (b) flowing a fluid through the flowline while the fiber optic line is disposed therein, thereby exerting strain on the fiber optic line, wherein the layer of coating enhances a responsiveness of the fiber optic line to a pressure exerted on the fiber optic line by magnifying the strain on the fiber optic line;
    (c) transmitting light into one end of the core; and
    (d) detecting back-reflected light from the core and analyzing the back-reflected light to determine a pressure distribution along the length of the optic line.

2. The method of claim 1, wherein step (c) comprises measuring a spectral shift of a Brillouin scattering back-reflected signal of light to determine the magnitude of the applied strain due to a pressure differential in the passageway.

3. The method of claim 1, wherein exerting a strain in step (b) comprises exerting a first strain on the core and exerting a second strain on the coating that is larger than the first strain.

4. The method of claim 1, wherein step (c) is performed while the fiber optic line is substantially stationary.

5. The method of claim 1, wherein step (a) comprises:
    extending an exterior portion of the fiber optic line through a sealing device to an exterior of the flowline; and
    step (c) occurs by transmitting light into the exterior portion.

6. The method of claim 1, wherein the flowline is in a subsea location and steps (c) and (d) are performed on a vessel.

7. The method of claim 1, wherein step (a) comprises attaching a forward end of the fiber optic line to a deploying device, inserting the deploying device into the flowline, and conveying the deploying device along the flowline, thereby causing the deploying device to pull the fiber optic line into the flowline.

8. The method of claim 1, wherein step further comprising retrieving the fiber optic line after step (d).

9. A fluid conveying apparatus, comprising:
    a flowline having a passageway extending axially therethrough;
    a fluid communicating through the flowline, the fluid having a fluid pressure;
    a fiber optic cable disposed within and extending along a length of the passageway of the flowline, the fiber optic cable experiencing a mechanical strain responsive to variations in the fluid pressure of the fluid communicating through the passageway of the flowline along the length of the flowline; and
    an enhancing layer surrounding the fiber optic cable that is more responsive to the fluid pressure of the fluid communicating through the passageway of the cable than the fiber optic cable, the enhancing layer enhancing the responsiveness of the fiber optic cable to the pressure by magnifying the mechanical strain associated with the fiber optic cable within a particular region of varying fluid pressure.

10. The apparatus of claim 9, wherein the fiber optic cable further comprises a core and a glass cladding surrounding the core.

11. The apparatus of claim 9, wherein the fiber optic cable further comprises a core and an inner layer surrounding the core that protects the core from chemicals in the fluid.

12. The apparatus of claim 9, wherein the fiber optic cable further comprises a core, a glass cladding surrounding the core, and an inner layer surrounding the cladding that protects the core and the glass cladding from chemicals in the fluid.

13. The apparatus of claim 9, wherein the fiber optic cable further comprises a core, an inner layer surrounding the core and an intermediate layer surrounding the inner layer, the intermediate layer being positioned between the inner layer and the enhancing layer.

14. The apparatus of claim 9, wherein the fiber optic cable further comprises a core, an inner layer surrounding the core and an intermediate layer of silicone surrounding the inner layer.

15. The apparatus of claim 9, wherein the enhancing layer comprises a nylon coating that surrounds the fiber optic cable.

16. The apparatus of claim 9, further comprising a fiber optic measurement instrumentation that sends light signals into the fiber optic core and measures a frequency shift of back-reflected light from the fiber optic core.

17. A fluid conveying apparatus, comprising:
    a flowline for transporting fluids produced from a well, the flowline having a passageway extending axially therethrough, and a length associated with the axis of the flowline;
    a fluid communicating through the flowline, the fluid having a fluid pressure;
    a fiber optic core disposed axially within the passageway of the flowline, the fiber optic core experiencing a mechanical strain responsive to variations in the fluid pressure of the fluid communicating through the passageway of the flowline along the length of the flowline;
    an enhancing layer surrounding the fiber optic core that is more responsive to the fluid pressure of the fluid communicating through the passageway of the cable than the fiber optic core, the enhancing layer enhancing the responsiveness of the fiber optic core to the pressure by magnifying the mechanical strain associated with the fiber optic core within a particular region of varying fluid pressure; and a fiber optic measurement instrumentation exterior of the flowline that sends light signals into the fiber optic core and measures a frequency shift of back-reflected light from the fiber optic core.

18. The apparatus of claim 17, wherein the enhancing layer is a nylon coating.

19. The assembly of claim 17, further comprising an protective layer located between the enhancing layer and the fiber optic core, the protective layer protecting the fiber optic core from chemicals in the fluid.

20. The assembly of claim 17, further comprising a cladding that surrounds the fiber optic core.

21. The assembly of claim 20, wherein a combined diameter of the fiber optic core and the cladding being about 180 microns.

22. The assembly of claim 17, further comprising a cladding, an inner layer, and an intermediate layer surrounding the fiber optic core, mechanical strain from the enhancing layer being communicated to the fiber optic core through the intermediate layer, the inner layer, and the cladding.

23. The assembly of claim 22, wherein a combined diameter of the fiber optic core, the cladding, the inner layer, and the intermediate layer being about 400 microns.

24. The assembly of claim 22, wherein the inner layer protects the fiber optic core from chemicals in the fluid.

25. The assembly of claim 22, wherein one of the cladding, the inner layer, the intermediate layer, and the enhancing layer insulates the fiber optic core in order to isolate the effects of fluid pressure from an effect of a fluid temperature.

26. The assembly of claim 17, wherein the flowline extends between a subsea wellhead and a subsea collection manifold.

27. The assembly of claim 17, wherein the flowline extends between a subsea structure and vessel located at a sea surface.

* * * * *